United States Patent [19]

DeGroot et al.

[11] Patent Number: 4,489,388
[45] Date of Patent: Dec. 18, 1984

[54] PLOT GENERATOR

[75] Inventors: Gerrit DeGroot, Hengelo; Alexander H. Slag, Haaksbergen, both of Netherlands

[73] Assignee: Hollandse Signaalapparaten B.V., Hengelo, Netherlands

[21] Appl. No.: 310,582

[22] Filed: Oct. 13, 1981

[30] Foreign Application Priority Data

Oct. 29, 1980 [NL] Netherlands ............................ 8005923

[51] Int. Cl.³ ............................................... G01S 7/04
[52] U.S. Cl. .................................. 364/517; 343/5 CF
[58] Field of Search ............... 33/281, 285; 350/330; 343/5 R, 5 DP, 12 R, 5 CF, 7 A; 364/138, 439, 456, 514, 517

[56] References Cited

U.S. PATENT DOCUMENTS

| | | | |
|---|---|---|---|
| 3,151,322 | 9/1964 | Hildebrandt | 343/5 DP |
| 3,214,754 | 10/1965 | Hildebrandt | 343/5 R |
| 3,325,806 | 6/1967 | Wilmot et al. | 343/5 R |
| 3,353,180 | 11/1967 | Anderson | 343/16 |
| 3,836,964 | 9/1974 | Evans | 343/7 A |
| 3,940,762 | 2/1976 | Ethington et al. | 343/5 DP |
| 3,981,008 | 9/1976 | Mann | 343/5 DP |
| 4,074,264 | 2/1978 | Wilmonti | 343/17.1 R |

Primary Examiner—Errol A. Krass
Assistant Examiner—Edward R. Cosimano
Attorney, Agent, or Firm—Robert J. Kraus

[57] ABSTRACT

A method and apparatus for reducing radar target data which must be processed by a data processor. The area covered by the radar is divided into a number of range-azimuth zones and a standard number of data to be processed for each zone is established. A target azimuth extent for each zone is continually adjusted to keep the number of data processed for each zone within the standard number for that zone.

8 Claims, 5 Drawing Figures

PLOT GENERATOR

BACKGROUND OF THE INVENTION

The invention relates to a method, of and plot generator for selecting angle, range and target azimuth extent data produced for targets and stored in a register. The generator comprises a video processor for generating the data on the reception of sensor signal data. The invention further relates to a radar system comprising such a plot generator or operating in accordance with said method. The angle, range and target azimuth extent data is hereafter frequently referred to as plot data, where the target azimuth extent is a measure for the reflective power of the target derived from the number of return signals obtained in successive radar scans.

The above plot generator is particularly useful in track-while-scan radar systems for air space surveillance, where in successive radar scans the return signals are correlated in range and, on the basis of the plot data then obtained per target and per antenna revolution, track parameters are generated. This requires the storage of return signal data of several successive radar scans in a memory. It is therefore of advantage to use a digital plot generator.

In order not to overload the central processor, which is necessary to calculate the track parameters, and to avoid long reaction times, incurred with the calculation of a certain false-track probability, the supply of plot data has to be strongly reduced. A large supply of plot data also influences the system's usability adversely. Hence, a selective supply of plot data is desirable. Important selection methods for this purpose rest in the first instance on the principle of the suppression of clutter, noise and return signals from fixed targets. Despite this, with the presence of large flocks of birds the number of plots generated increases to excess with all its consequences. However, the means applied in practice, such as sensitivity time control (STC) and circular polarisations in the existing radar systems, are not adaptive, that is they are not dynamic and unsuitable for adaptation to changes in weather, sea state and ambient conditions. The provision of a more powerful STC in the radar system does not give the desired solution either, because a reduction in the number of passed return signals from birds is associated with a significant decrease of the plot detection probability.

SUMMARY OF THE INVENTION

The present invention has for its object to provide a solution to obviate the above disadvantges.

The solution to this problem is based on dividing the radar coverage into a number of range-azimuth zones and on establishing a standard number of plots to be processed for each zone, which standard number depends on the position of the zone in respect of the target approach routes, allowing for a maximum number of plots to be processed by the central processor each antenna revolution.

A suitable solution to the problem of arriving at a number of plots corresponding with the standard number through a strong reduction of the number of target returns processed per zone, whereby the above disadvantages are obviated, rests on the understanding that the target azimuth extent depends on the degree of correlation between the return signals during successive radar scans. This implies that the azimuth extent of return signals from birds is smaller than that from aircraft.

The present invention therefore provides for a plot selection per zone on the basis of a threshold for the target azimuth extent, i.e. during a number of successive radar scans the number of return signals correlated in range per target is compared with a minimum number prescribed for the zone concerned. The solution thus presented implies a limitation of the number of plots to be passed without noticeable decrease of the detection probability.

Furthermore, the energy intensity and hence the target azimuth extent are strongly dependent upon the radar configuration. For example, by switching from a high to a low radar scanning beam with the detection of return signals in advanced radar systems, the target azimuth will depend on the target environmental conditions. Thus a changing configuration of the ground causes the video response to vary, while buildings with displaced facades—especially with an MTI control in the radar receiver—bring about a strong video response; this also results in a direction dependence in the radar sensitivity.

The above reasons give occasion to the application of a separate threshold for the target azimuth extent in each of the established zones.

According to the invention, the method for selecting angle, range and target azimuth data produced per target by a plot generator and stored in a register or buffer memory, as described in the opening paragraph, comprises the steps of:
- a. separately storing in an adaptive memory a distinct target azimuth extent threshold for each of the range-azimuth zones into which the sensor area is divided;
- b. converting angle and range data, produced for a target by the video processor, into a first address control signal relating to the zone concerned;
- c. reading out from the adaptive memory the zone-related target azimuth extent threshold by means of the (first) address control signal;
- d. comparing the target azimuth extent data supplied by the video processor with the target azimuth extent threshold read from the adaptive memory; and
- e. producing an erase signal for effecting erasing of the angle, range and target azimuth extent data stored in the buffer memory if the supplied target azimuth extent data fails to meet the read-out threshold for the azimuth extent.

A favorable method according to the invention is obtained when the azimuth extent threshold is adjustable per zone and per antenna revolution and is dependent on the number of plots produced in the zone concerned. In a period of a small number of plots produced per zone the azimuth extent threshold is allowed to assume a small value, whereas in a period of numerous plots, where the increase usually concerns flying motions of birds, this threshold must be of a larger value.

Automatic adjustment of the threshold for the target azimuth extent per zone is obtained by the application of the method according to the invention if the method further includes the steps of:
- a. recording the number of comparisons for each zone and per antenna revolution, where the supplied target azimuth extent data exceeds or equals the threshold for the target azimuth extent read from the adaptive memory;

b. successively producing, once per antenna revolution, zone-related second address control signals for reading out of a fixed memory the standard number relating to the zone concerned and the recorded number relating to the zone;

c. comparing the recorded number with the readout standard number;

d. producing a first control signal when the recorded number is greater than the readout standard number, and a second control signal when the recorded number is smaller than the readout standard number; and e. increasing or decreasing by a fixed value the target azimuth extent threshold in the adaptive memory with the application of, respectively, the first or the second control signal.

BRIEF DESCRIPTION OF THE DRAWING

The invention will now be described with reference to the accompanying figures, of which.

DESCRIPTION OF THE PREFERRED EMBODIMENT

Figure 1:
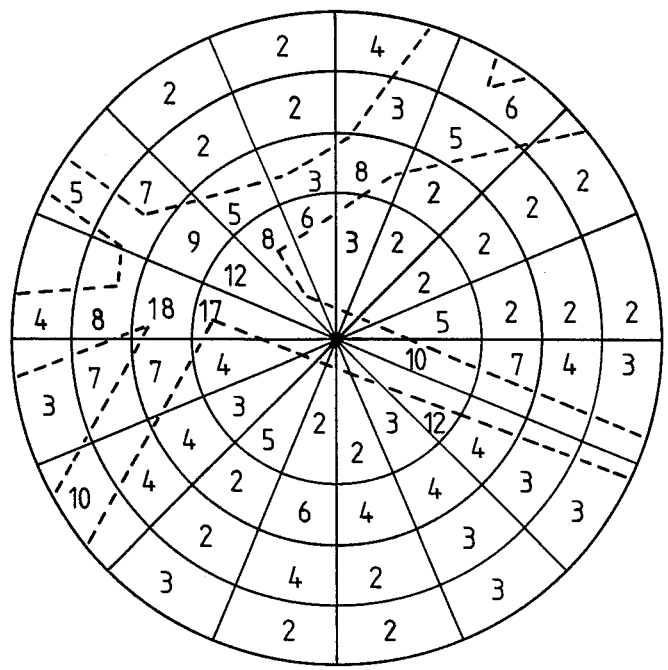
FIG. 1 is a graphical representation of the sensor area.

FIG. 1 is a graphical representation of the area covered by a surveillance radar of an air control system, showing a number of air routes by dashed lines. The target returns obtained from this radar are used to execute the video processing and the plot and track calculation of the moving targets in the area of surveillance. The tracking part of the air control system however experiences great difficulties if large numbers of return signals, predominantly from flying birds, are involved in the track calculation. Therefore, the plots already calculated for the target azimuth extent must be selected after the plot generation but before the track generation.

Figure 2:
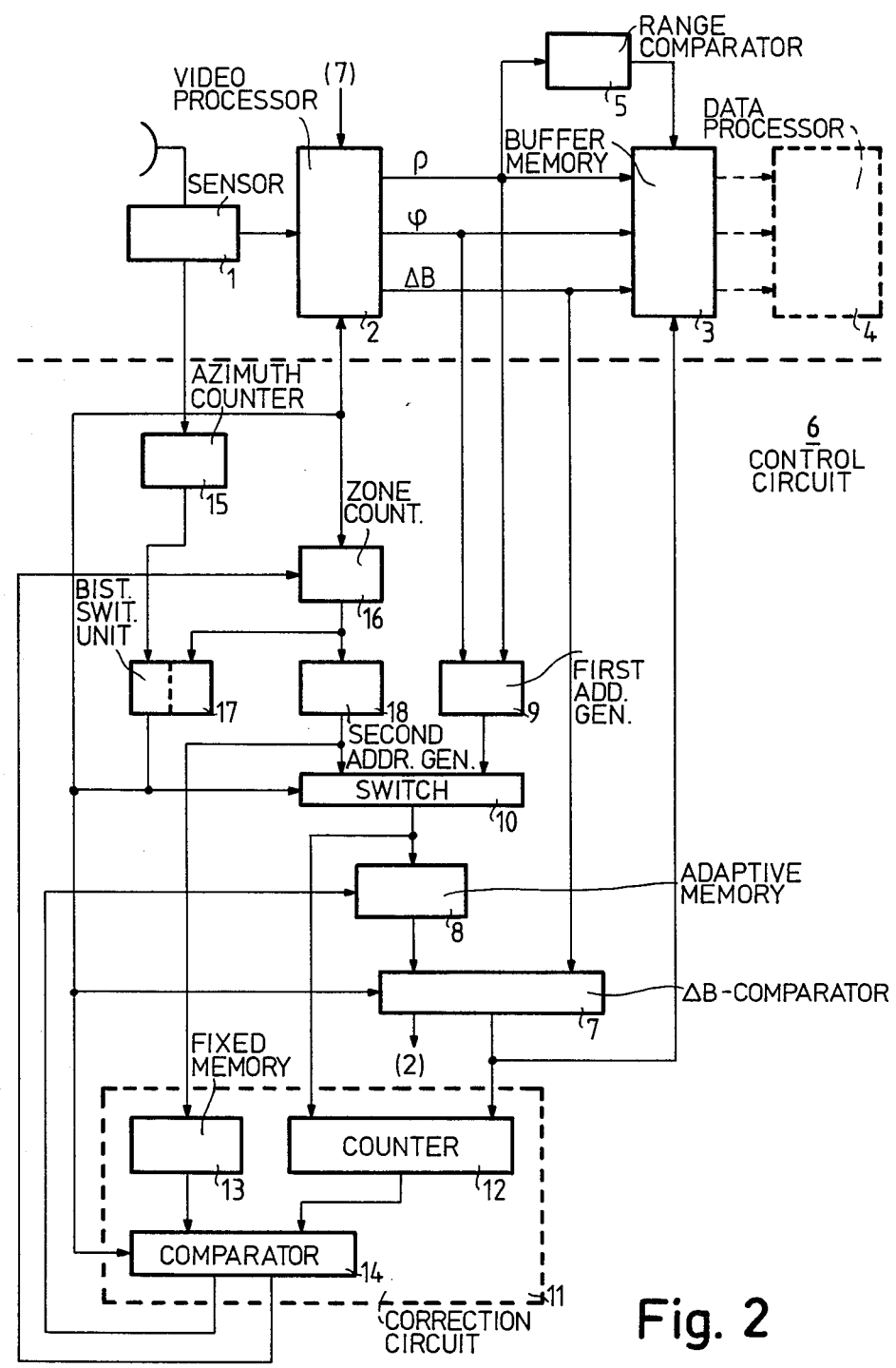
FIG. 2 is a feasible embodiment of a plot generator according to the invention.

Because the radar sensitivity varies in range and in azimuth, it is inadvisable to use a uniform threshold for the target azimuth extent over the entire radar range in making the selection to be applied. It is however desirable to divide the entire radar range into zones defined in range and in azimuth, hereinafter called range-azimuth zones, and to assign to each zone a separate threshold for the target azimuth extent. In this way each target, depending on the zone in which it is situated, is checked with a special azimuth extent threshold. This is the operating principle of the embodiment of a radar system including a plot generator, as shown in FIG. 2. In this embodiment the surveillance radar operating as sensor is denoted by 1. The target return signals received by the radar are supplied in the form of video signals to a video processor 2, in which they are subjected to various processes, such as clutter suppression, MTI, etc. Video processor 2 also calculates the centroid coordinates $(\rho, \phi)$ and the azimuth extent $(\Delta B)$ of the target from a number of successive radar scans on the basis of range correlation, using the return signals of one and the same target out of a number of successive radar scans. The parameters $(\rho, \phi, \Delta B)$ so obtained, i.e. the plot data of the target, are supplied to a register or buffer memory 3, where they are subjected to certain conditions before being passed. In the embodiment of FIG. 2 each group of parameters is checked with two conditions; if one of these conditions is met, the group of parameters are passed from buffer memory 3 to a data processor 4. The first condition applied relates to the range $\rho$ between the target and the radar; if $\rho$ is greater than a predefined minimum value $\rho_0$, the group of parameters is transferred, without further conditions, from buffer memory 3 to a data processor 4. The radar system of FIG. 2 is provided with a range comparator 5, connected to the output of video processor 2 supplying the $\rho$ value, for producing (on the basis of the result of a comparison) a characteristic transfer control signal for buffer memory 3. The underlying principle is that for a large range the clutter intensity and return signal strength from birds is low, thus implying only a slight load for the tracking part of the radar system.

The second condition relates to the azimuth extent $(\Delta B)$ of the target; if the azimuth extent remains below a predefined threshold $\Delta B(I)_m$ and the range between the target and the radar system is smaller than $\rho_0$, transfer of the group of parameters from buffer memory 3 to data processor 4 is inhibited. The radar system is provided with a control circuit 6, comprising a comparator 7 of a first type, hereinafter called the $\Delta B$ comparator. This comparator, connected to the $\Delta B$ output of video processor 2, produces (on the basis of the result of a comparison) a characteristic transfer control signal for buffer memory 3. However, due to the variation in the range and azimuth dependence of the antenna sensitivity it is not possible to make the comparison in $\Delta B$ comparator 7 on the basis of one single value of $\Delta B(I)_m$. Therefore, as already stated, the radar range is divided into range-azimuth zones, where each zone is assigned with a predefined value of $\Delta B(I)_m$ to perform the comparison for the target azimuth extent. Control circuit 6 comprises an adaptive memory 8, containing a location for each range-azimuth zone to store a specific value $\Delta B(I)_m$ of the target azimuth extent. The control circuit 6 is further provided with a first address generator 9, connected to the $\rho$ and the $\phi$ outputs of video processor 2, for generating an address control signal $I(\rho,\phi)$, characteristic of the respective zone, on the supply of a $\rho$-$\phi$ combination of the parameter group to be examined. The address control signal is fed to the adaptive memory 8 via a switch 10, discussed hereafter, to allocate the memory location of the azimuth extent threshold $\Delta B(I)_m$ for this zone specifically, making $\Delta B(I)_m$ available for the comparison in $\Delta B$ comparator 7. This comparator is also supplied with the $\Delta B$ value of the $\rho$-$\phi$ combination. $\Delta B$ comparator 7 produces a transfer control signal, depending on the comparison result. This signal, supplied to buffer memory 3, determines whether the stored group of parameters $(\rho, \phi, \Delta B)$ is to be transferred to data processor 4. The $\Delta B$ comparator 7 also furnishes a pulse to start the examination for the target azimuth extent on a following group of plot parameters to be supplied by video processor 2. It is thus possible to limit the supply of plot data to the tracking part of the air control system.

During operation of the system there may however be periods when the plot supply per zone to the above-mentioned tracking part is considerably smaller than the set standard value. In such a case, a greater amount of plot data would be acceptable, provided the target azimuth extent per zone were to be decreased temporarily, such that a set standard number of plots were not exceeded. Therefore, the value of the azimuth entent threshold will be determined in dependence upon the number of plot data per zone, which number is not to be exceeded.

FIG. 1 shows an example of the maximum number of plot data to be processed per antenna revolution in each zone. In each zone the azimuth extent threshold determined per antenna revolution is of such a value that the set number of data per zone and per antenna revolution is not or not appreciably exceeded. However, in this case, continuous adjustment of the azimuth extent threshold is necessary.

For this purpose the control circuit 6 of FIG. 2 comprises a correction circuit 11 for recording the number of plot data transferred per zone and per antenna revolution period from buffer memory 3 to data processor 4 and, depending on the number of plot data recorded per zone, for correcting the value of the azimuth extent threshold stored in the adaptive memory 8.

To record the number of times the plot data are passed per zone and per antenna revolution by buffer memory 3, correction circuit 11 comprises a counter 12 including a plurality of respective sub-counters to count for each zone and each antenna revolution the number of effective transfer control signals generated by comparator 7. Counter 12 receives, with the application of each transfer control signal, information from the zone concerned, which information is supplied from the first address generator 9 via switch 10 to select the specific sub-counter. Correction circuit 11 also comprises a fixed memory 13 and a comparator 14 of a second type, connected to counter 12 and fixed memory 13. The standard number of plot recordings x(I) per zone are stored in fixed memory 13. Once per antenna revolution and per zone the number of plots $\hat{x}(I)$ recorded in counter 12 is compared in comparator 14 with the standard number x(I) of the fixed memory 13. If the counter-recorded number is greater than the standard number of the fixed memory 13, comparator 14 generates a correction signal of the first type to increment the value $\Delta B(I)_m$ of the azimuth extent threshold of the zone concerned in adaptive memory 8. In the case when the counter-recorded number $\hat{x}(I)$ is less than or equal to the standard number x(I) of the fixed memory 13, comparator 14 generates a correction signal of the second type to decrement the value of the azimuth extent threshold $\Delta B(I)_m$ in adaptive memory 8. The number $\hat{x}(I)$ recorded by counter 12 for this zone will then be erased. This azimuth extent threshold correction may be performed at all times, except in the period when the video processor 2 could provide plot data on the relevant zone.

A first possibility as to the time to perform any corrections is obtained at the moment after the production of all data by video processor 2 in a complete antenna revolution ($\phi_A = 0°$). Hence, the division of the zones over the radar range should be adapted also.

The control circuit 6 is thereto provided with an azimuth counter 15, a zone counter 16, a logical bistable switching unit 17, and a second address generator 18. As soon as azimuth counter 15, connected to sensor 1, records a "north transit" of the antenna of sensor 1, it supplies a setting pulse to logical bistable switching unit 17, which in response generates a switching signal applicable for various purposes. First, this signal is fed to video processor 2 to temporarily stop the supply of ($\rho$, $\phi$, $\Delta B$) data. Second, the switching signal puts $\Delta B$ comparator 7 out of action, whereas it activates comparator 14. Third, it is applied to activate the zone counter 16, setting its count to the maximum value. Counter 16 keeps count of the number of zones which still have to be reassessed for the azimuth extent threshold $\Delta B(I)_m$. After setting of counter 16 the instantaneous count is applied to the second-address generator 18, which in response generates a specific address control signal for the adaptive memory 8 and counter 12 (via switch 10) and for the fixed memory 13. Since, in such a case, the supply of address information from address generator 9 to memory 8 is to be stopped, the switching signal of switching unit 17 is applied to switch 10 to start conducting to supply the address control signals from second address generator 18 to memory 8. From the memory locations assigned by the address control signal of generator 18, designating specific sub-counters in counter 12 and address in fixed memory 13, the recorded number $\hat{x}(I)$ of plot data in the particular zone, or the standard number x(I) for this zone are supplied to comparator 14. In response, this comparator generates the correction signal for adjusting the then current azimuth extent threshold $\Delta B(I)_m$ at the memory location assigned by the second address control signal $I_m$ in adaptive memory 8. Comparator 14 also produces a count pulse, fed to zone counter 16 to decrement the count. Counter 16 is to receive this count pulse with such a delay that sufficient time is obtained to be able to adjust the azimuth extent threshold $\Delta B(I)_m$. Thereafter the process repeats itself, and the azimuth extent threshold of the zone indicated by the decremented count is reassessed. When counter 16 has reached zero count, it supplies a switching pulse to switching unit 17, returning the control circuit 6 to the previous state. This means that the blocking signal of switching unit 17 to video processor 2 drops out, switch 10 is set in the conducting state for information transfer from first address generator 9, $\Delta B$ comparator 7 is activated, and comparator 14 is deactivated. From the above it follows that switch 10 must be in the conducting state for the second address control signals $I_m$ at the instant when $\phi_A = 0$. However, the limitation to be put thereon is that the above process is performed only during the "dead time" between two successive radar scans.

Another possibility to perform the process of reassessing the threshold $\Delta B(I)_m$ is when this occurs in the "dead time" between two random successive radar scans, generating only the (second) address control signals $I_m$ of those zones which show no relation with these radar scans.

Figure 3:
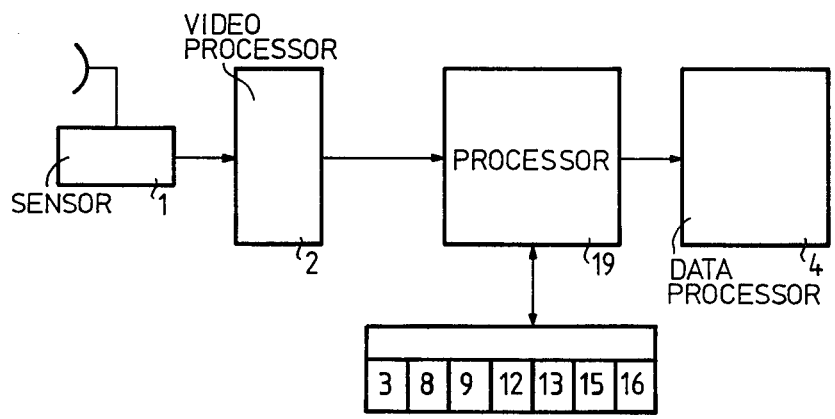
FIG. 3 is a feasible embodiment of a plot generator provided with a processor for executing the method according to the invention.
Figure 4:
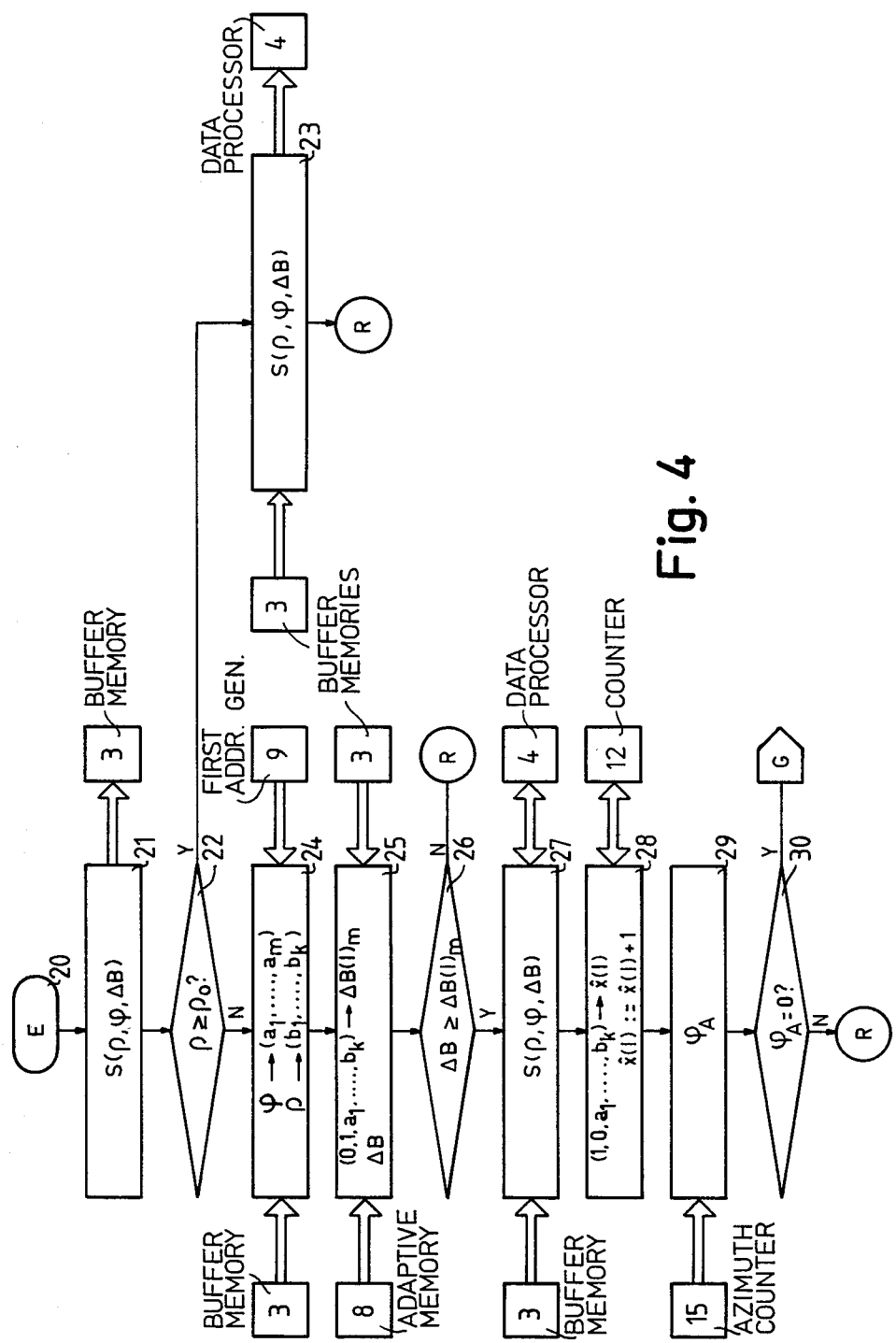
FIG. 4 is a first part of the flow diagram for the method to be executed by the plot generator of FIG. 3.

It is also possible to use a processor 19 added to the plot generator to perform the above-described process on a software basis. A means suitable for this purpose is shown in FIG. 3, operating in accordance with the flow diagram of FIGS. 4 and 5. A suitable processor may be any general-purpose computer, for example the SMR'MU type of Hollandse Signaalapparaten B.V., Hengelo, The Netherlands.

The latter processor also comprises means described hereinbefore and hence denoted by corresponding reference numerals. The flow diagram shows after starting point E the process step 21, by which the plot data produced by processor 2, viz. the group of plot parameters ($\rho$, $\phi$, $\Delta B$), are supplied to processor 19. With the subsequent process step 22 it is decided whether the target range $\rho$ is greater than or equal to a predetermined minimum value $\rho_0$. In case of an affirmative answer (Y), the plot data from buffer memory 3 is supplied to processor 4 with a following process step 23, and a reset signal (R) is generated to repeat the process at step 21 for an examination of the next group of parameters ($\rho$, $\phi$, $\Delta B$). If the answer to the question of step 22 is negative (N), an additional examination is performed, starting with process step 24. With this step the address generator 9 produces a code word ($a_1, a_2, \ldots, a_m$) upon the supply of the target azimuth value $\phi$ on the basis of a division of the antenna scanning area into $2^m$ sectors. This process may, for example, be proformed by omitting a number of least significant bits of the digital value of $\rho$. With the same process step the address generator also produces a code word ($b_1, b_2, \ldots, b_k$) upon the supply of the target range $\rho$ on the basis of a division of the radar range into $2^k$ range rings. From the combination of the two code words ($a_1, \ldots, a_m$; $b_1, \ldots, b_k$)≡($a_1, \ldots, b_k$), a representation of the zones pertaining to the radar range is obtained, so that with the following process step 25 such a combination, supplemented for example with a code word (0,1) as address (0, 1, $a_1, \ldots, b_k$), can be utilised for reading the target azimuth extent threshold $\Delta B(I)_m$ of the associated range-azimuth zone out of the adaptive memory 8. Simultaneously with the readout of $\Delta B(I)_m$ a request is made for the azimuth extent $\Delta B$ in the buffer memory 3. With the following process step 26 it is decided whether the applied azimuth extent $\Delta B$ from memory 3 is greater than or equal to the applied azimuth extent threshold $\Delta B(I)_m$ just fetched from memory 8. If the answer is negative (N), the process is reset (R) and started again from step 21 to examine the next group of parameters. If however this question is answered in the affirmative (Y), the plot data are read out of buffer memory 3 with the next process step 27 and transferred to the data processor 4 required for track calculations. With the next process step 28 the number of plots $\hat{x}(I)$ recorded for the zone concerned is read out of counter 12 (in which the number of plots $\hat{x}(I)$ used is recorded for each zone and each antenna revolution) with the aid of a suitable address, e.g. (1, 0, $a_1, \ldots, b_k$), then incremented by one, and subsequently re-entered in counter 12.

Next is process step 29 for reading out the angular value $\rho_A$ of the azimuth counter 15, whereupon process step 30 puts the question whether this angular value equals 0 ($\rho_A = 0$?). If the answer to this question is negative (N), the process is reset (R) to process step 21. If the answer is affirmative (Y), reference is made with label G to the flow diagram of FIG. 5, showing the second part of this process.

Figure 5:
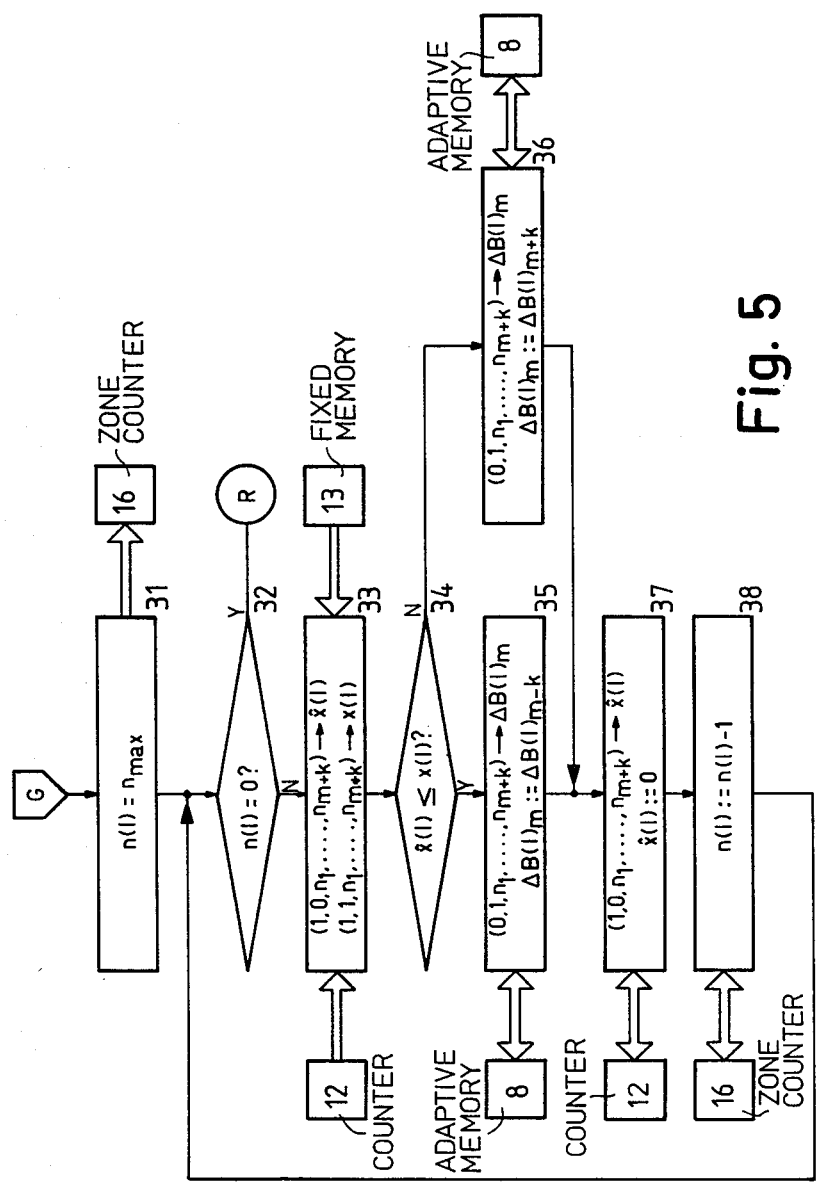
FIG. 5 is the second part of the flow diagram for the method to be executed by the plot generator of FIG. 3.

In FIG. 5 the first process step 31 indicates that for zone counter 16 the maximum existing count, $n_{max} = (1, 0, n_1, \ldots, n_{m+k})$, is written into memory. Since an iterative process is started, where zone counter 16 is decremented by one at the end of each process run and this process is to be terminated at the minimum zone count, it is useful to include process step 32 to put the question whether (1, 0, $n_1, \ldots, n_{m+k}$) = (1, 0, 0, \ldots, 0). Step 33 gives the answer to this question; if negative (N), both the number $\hat{x}(I)$ pertaining to the particular zone and the standard number $x(I)$ assigned to this zone are read out of counter 12 and memory, 13 respectively, using the address indicated by the zone count. The following process step 34 puts the question whether $\hat{x}(I) \leq x(I)$. In case of an affirmative answer (Y), the azimuth extent threshold $\Delta B(I)_m$ pertaining to the particular zone is fetched from memory 8 in process step 35, using a suitable address, for example (0, 1, $n_1, \ldots, n_{m+k}$), and is decremented by a value k, whereupon the result is re-entered into memory at the assigned location. If the answer given in step 34 is negative (N), the next process step is 36, corresponding with step 35, but $\Delta B(I)_m$ is incremented by a value k.

After process step 35 or 36, process step 37 follows to reset the number $\hat{x}(I)$ in counter 12 at the location addressed by (1, 0, $n_1, \ldots, n_{m+k}$) to zero. Next is process step 38 to decrement the count in zone counter 16 by one; then the second phase of the process is repeated, starting with process step 32 until an affirmative answer (Y), to the question of process step 32 is obtained. In such a case the second phase of the process in FIG. 5 is reset (R) to the first phase in FIG. 4 to resume the process starting with step 21.

Instead of obtaining the information of the target azimuth extent $\Delta B(I)_m$, the recorded number of plots $\hat{x}(I)$ and the standard number for plots $x(I)$ with the aid of addresses (0, 1, $a_1, \ldots, b_k$), (1, 0, $a_1, \ldots, b_k$) and (1, 1, $a_1, \ldots, b_k$), this may be done in two successive, shorter program steps: in the first program step with address ($a_1, \ldots, b_k$) access is gained to the complete amount of information for the particular zone and in the second program step three decoded signals, LR, MR and RR, are used to individually obtain the three types of information available for this zone.

We claim:

1. A method of selecting for processing target angle, range and azimuth extent data produced in response to the detection of respective targets in an area under surveillance and successfully held in buffer storage means, said method comprising the steps of:
    (a) storing, in respective addresses of an adaptive memory, distinct target azimuth extent thresholds for a plurality of range-azimuth zones into which the area is divided;
    (b) producing, in a first address generator, a first address control signal representing the respective zone encompassing the range and angle defined by the data currently held in the buffer storage means;
    (c) reading, from the adaptive memory, the target azimuth extent threshold for the zone represented by the first address control signal;
    (d) comparing, in a first comparator, the target azimuth extent data in the buffer storage means with the respective target azimuth extent threshold read from the adaptive memory; and
    (e) inhibiting processing of the data held in the buffer storage means if the target azimuth extent data held therein is smaller than the respective target azimuth extent threshold.

2. A method as in claim 1 and further comprising the steps of:
    (a) recording, in respective counters, the number of comparisons for each zone and for a predefined surveillance period, where the target azimuth extent data held in the buffer storage means equals or exceeds the respective target azimuth extent threshold, said data being selected for processing;
    (b) successively producing, in a second address generator, between surveillance periods, address control signals representing the zones into which the area under surveillance is divided;
    (c) successively reading, from a fixed memory, in response to the address control signals produced by the second address generator, a predetermined number of said selected data for each of the range-azimuth zones;

(d) successively comparing, in a second comparator, the predetermined numbers for the zones with the numbers recorded in the respective counters; and (e) successively modifying selected ones of the values of target azimuth extent thresholds stored in the adaptive memory for the zones represented by the address control signals produced by the second address generator, said modification being effected by:

(1) increasing the value for each zone for which the recorded number is greater than the predetermined number, and (2) decreasing the value for each zone for which the recorded number is smaller than the predetermined number.

3. A plot generator including a video processor for producing target angle, range and azimuth extent data in response to the detection by a sensor of respective targets in an area under surveillance, a buffer memory coupled to the video processor for receiving the data, and a control circuit for selectively controlling the transfer of said data through the buffer memory to a data processor, said control circuit comprising:

(a) an adaptive memory for containing distinct azimuth extent thresholds for a plurality of range-azimuth zones into which the area is divided;

(b) a first address generator, coupled to the video processor and to the adaptive memory, for producing an address control signal representing the respective zone encompassing the range and angle defined by said data, and for applying said address control signal to the adaptive memory; and (c) a first comparator, coupled to the video processor, the adaptive memory and the buffer memory, for comparing the azimuth extent data produced by the video processor with the azimuth extent threshold stored in the adaptive memory for the zone represented by the address control signal, said comparator means applying a transfer signal to the buffer memory if said azimuth extent data is at least equal to said azimuth extent threshold.

4. A plot generator as in claim 3, where the control circuit includes:

(a) a correction circuit comprising:

(1) a plurality of counters, coupled to the first address generator and to the first comparator, for recording the numbers of transfer control signals produced by the comparator for respective zones and for a predefined surveillance period;

(2) threshold correction means, coupled to the adaptive memory and to the counters; and (b) a second address generator, coupled to the threshold correction means and to the adaptive memory, for successively producing, between surveillance periods, address control signals representing the range-azimuth zones into which the area under surveillance is divided;

said threshold correction means responding to the address control signals produced by the second address generator by applying correction signals to the adaptive memory to modify the values of target azimuth extent thresholds stored therein for which the numbers recorded in the counters for the respective zones differ from predetermined numbers of transfer control signals for said zones.

5. A plot generator as in claim 4 where the control circuit includes switching means coupled to the first and second address generators for alternately supplying the address control signals from the first and second address generators to the adaptive memory, to the threshold correction means, and to the counters, during and between the surveillance periods, respectively.

6. A plot generator as in claim 5 where the threshold correction means comprises:

(a) a fixed memory for successively producing the predetermined numbers of transfer control signals in response to the address control signals produced by the second address generator; and (b) a second comparator, coupled to the fixed memory and to the counters, for comparing the predetermined numbers produced by the fixed memory with the actual numbers of transfer control signals recorded in the respective counters and for producing said correction signals.

7. A plot generator as in claim 4 where the control circuit includes:

(a) an azimuth counter, coupled to the sensor, for producing a reference signal at a predefined azimuth value; and (b) a zone counter, coupled to the azimuth counter and the second address generator, for responding to the reference signal by successively producing zone-identifying numbers which effect production by said generator of the respective address control signals.

8. A plot generator as in claim 3 including a range comparator, coupled to the video processor and to the buffer memory, for effecting transfer of the target angle, range and azimuth extent data through the buffer memory when the value of the range data exceeds a predetermined value.

* * * * *